Patented Mar. 21, 1950

2,501,455

UNITED STATES PATENT OFFICE 2,501,455

3,6 - BIS DICHLOROETHYL-2,5-DIKETO-PIPERAZINE DERIVATIVES AND HYDROLYSIS PRODUCTS THEREOF

Jakob A. Stekol, Glenside, Pa., assignor to The Lankenau Hospital, Philadelphia, Pa., a corporation of Pennsylvania No Drawing. Application February 16, 1948, Serial No. 8,743

6 Claims. (Cl. 260—268)

This invention relates to a new chemical compound which I have designated as homolanthionine, to new intermediate condensation products of dichloroethyldiketopiperazine and to a process of synthesizing cystathionine, homolanthionine and the new and useful intermediate condensation products referred to above.

The synthesis of cystathionine and homolanthionine hereinafter described is based on the condensation of cysteine or homocysteine with dichloroethyldiketopiperazine in liquid ammonia followed by the acid hydrolysis of the condensation products, which are new and useful of themselves, to yield cystathionine and homolanthionine respectively. While specific examples are set forth below, it will be understood by those skilled in the art that variations may be employed within the general scope of the process involved.

EXAMPLE 1

Synthesis of cystathionine 10 grams of metallic sodium were dissolved in 500 ml. of liquid ammonia and 24 grams of L-cystine were added to the solution in small portions with constant agitation of the reaction mixture. The blue color of the excess sodium was discharged by a few crystals of L-cystine. 24 grams of 3,6-bis ($\beta$-chloroethyl)-2,5-diketopiperazine were then added to the cysteine thus formed in the reaction vessel in small portions with thorough mixing of the solution. After all the diketopiperazine derivative had been added, the ammonia was allowed to evaporate, and the reaction vessel was evacuated in order to remove as much ammonia as possible from the residue. The latter was then dissolved in about 300 ml. of ice cold water and the solution was filtered through a bed of decolorizing carbon. The filtrate was adjusted with hydrochloric acid to about pH 9, and about 3 grams of sodium cyanide were added to the solution in order to convert any unreacted cystine to the soluble form. After 10 to 15 minutes the pH of the solution was adjusted under a hood with hydrochloric acid to 6.0. After standing in a refrigerator overnight, the precipitated material was removed by filtration, washed with cold water, then recrystallized from a dilute ammoniacal solution by addition of hydrochloric acid to pH 6.0. The crystallized product was suspended in water, removed by filtration, and washed successively with water, ethanol, and ether. After drying in vacuo at 100° C. over $P_2O_5$, the product decomposed at 260–265° C. The compound gave a negative sodium cyanide-nitroprusside test. The ninhydrin test was positive. The diketopiperazine derivative, 3,6-bis (S-($\beta$-amino, $\beta$-carboxyethyl)-ethyl)-2,5-diketopiperazine, thus produced gave a negative sodium cyanide-nitroprusside test and the ninhydrin test was positive.

10 grams of the diketopiperazine derivative prepared as described above were hydrolyzed by refluxing with 150 ml. of 20 per cent hydrochloric acid for 3 hours. The solution was then evaporated in vacuo to dryness on a steam bath, and the residue was dissolved in 50 ml. of water. Only a slight darkening of the solution of the diketopiperazine derivative in hydrochloric acid resulted after 3 hours of refluxing. The solution was then decolorized and filtered. The filtrate was adjusted with dilute sodium hydroxide to pH 6.0 and cooled in an ice-bath. Crystallization may be speeded up by the addition of ethanol (to about 40 per cent concentration with respect to ethanol). After standing in a refrigerator overnight, the crystallized material was removed by filtration and washed with cold water. After recrystallization from dilute ethanol and drying in vacuo at 100° C. over $P_2O_5$, the product weighed 10 grams, or 90 per cent of the theoretical amount. It decomposed at 270–274° C. The sodium cyanide-nitroprusside test on the material was negative. The analytical results are shown below.

|  | C | H | N | S |
|---|---|---|---|---|
| Found | 37.01 | 6.47 | 12.60 | 14.18 |
| Calc. for $C_7H_{14}N_2SO_4$ | 37.38 | 6.36 | 12.61 | 14.41 |

The resulting product, namely, S-($\beta$-amino, $\beta$-carboxyethyl)-homocysteine, is referred to in the present specification and in the appended claims as cystathionine.

The reaction of Example 1 is represented by the following:

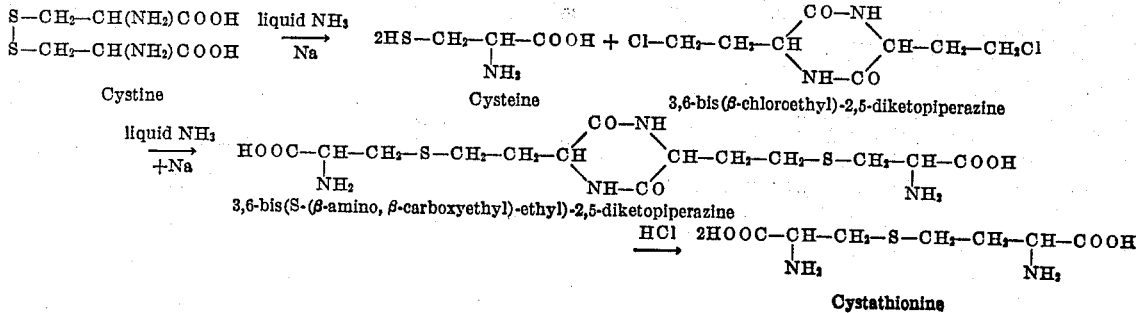

EXAMPLE 2

*Synthesis of homolanthionine*

10 grams of metallic sodium were dissolved in 500 ml. of liquid ammonia and 10 grams of DL-methionine were added to the solution in small portions with constant agitation of the reaction mixture. 8 grams of 3,6-bis($\beta$-chloroethyl)-2,5-diketopiperazine were then added in small portions to the homocysteine thus formed with thorough mixing. The resulting solution was treated as in Example 1 and yielded 7.5 grams of 3,6-bis(S-($\gamma$-amino, $\gamma$-carboxypropyl)-ethyl)-2,5-diketopiperazine. This product after recrystallization from dilute ethanol had a decomposition range of 270–273° C. and gave a negative sodium cyanide-nitroprusside test and a positive ninhydrin test.

10 grams of the diketopiperazine derivative prepared as above were hydrolized in 150 ml. of 20 per cent hydrochloric acid in the same manner as described in Example 1 for the acid hydrolysis of the diketopiperazine derivative of that example to cystathionine. The resulting product, namely, S-bis-($\gamma$-amino, $\gamma$-carboxypropyl)-sulfide, is referred to in the present specification and in the appended claims as homolanthionine. The yield of homolanthionine was 9.3 grams. After drying in vacuo at 100° C. over $P_2O_5$, it decomposed at 269–272° C.

The reaction of Example 2 is represented by the following:

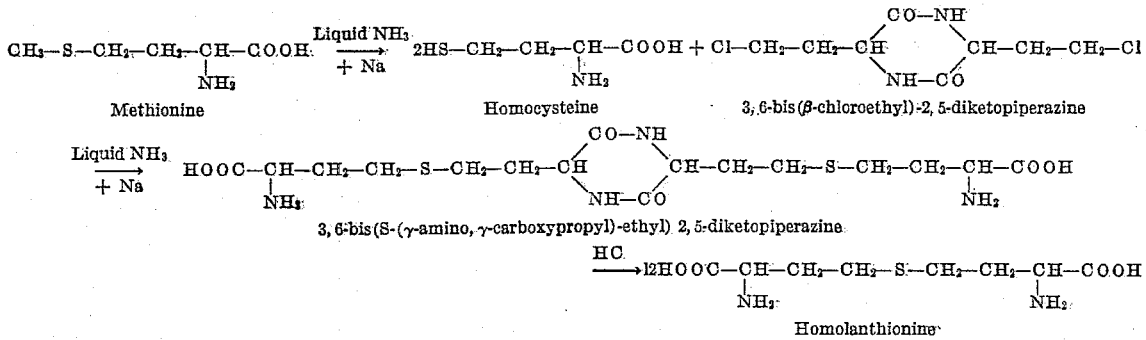

EXAMPLE 3

The intermediate condenstation product 3,6-bis(S-($\gamma$-amino, $\gamma$-carboxypropyl)-ethyl)-2,5-diketopiperazine of Example 2 was prepared by following the procedure of Example 2 but using 13.2 grams of homocysteine and 12.05 grams of dichloroethyldiketopiperazine. The yield of the condensation product was 18 grams and this was hydrolyzed to homolanthionine following the procedure of Example 2.

EXAMPLE 4

The intermediate condensation product of Example 2 was prepared by substituting S-benzylhomocysteine for the homocysteine of Example 2. The intermediate product thus obtained was then converted to homolanthionine following the procedure of Example 2.

While the use of hydrochloric acid is specified in the above examples for carrying out the acid hydrolysis step it will be understood by those skilled in the chemical art that other well-known hydrolyzing compounds may be employed. It will likewise be apparent that other homologues of cystathionine may be prepared by means of the dichloroethyldiketopiperazine condensation reaction of the present invention followed by the hydrolysis of the condensation product, although homolanthionine is the only homologue specifically referred to in the present specification. Where other homologues of cystathionine are desired the process is carried out using the appropriate homologue of cystine as a starting point. It will also be apparent that various isomers of the starting materials may be used.

So far as I am aware neither homolanthionine nor the intermediate condensation products referred to in the above examples have been synthesized heretofore nor have they been found to exist in nature. They are of particular interest in the field of physiology from the standpoint of their use by animals for growth purposes in lieu of methionine or cystine.

Having thus described my invention, I claim:

1. The method of preparing 3,6-bis(S-($\gamma$-amino, $\gamma$-carboxypropyl)-ethyl)-2,5-diketopiperazine which comprises condensing homocysteine with 3,6-bis($\beta$-chloroethyl)-2,5-diketopiperazine, the reaction being carried out so as to produce said 3,6-bis(S-($\gamma$-amino, $\gamma$-carboxypropyl)-ethyl)-2,5-diketopiperazine.

2. The method of preparing S-bis-($\gamma$-amino, $\gamma$-carboxypropyl)-sulfide which comprises hydrolyzing 3,6-bis(S-(amino, carboxypropyl)-ethyl)-2,5-diketopiperazine, the reaction being carried out so as to produce said S-bis-($\gamma$-amino, $\gamma$-carboxypropyl)-sulfide.

3. The method of preparing S-bis-($\gamma$-amino, $\gamma$-carboxypropyl)-sulfide which comprises dissolving methionine in liquid ammonia, condensing the resulting product with dichloroethyldiketopiperazine and then hydrolyzing the condensation product thus obtained, the reaction being carried out so as to produce said S-bis-($\gamma$-amino, $\gamma$-carboxypropyl)-sulfide.

4. As a new chemical compound 3,6-bis(S-($\gamma$-amino, $\gamma$-carboxypropyl)-ethyl)-2,5-diketopiperazine.

5. S-bis-($\gamma$-amino, $\gamma$-carboxypropyl)-sulfide.

6. The method of preparing S-bis ($\gamma$-amino, $\gamma$-carboxypropyl)-sulfide which comprises condensing a compound selected from the group consisting of homocysteine and S-benzyl-homocysteine with dichloroethyldiketopiperazine and subjecting the resulting condensation product to hydrolysis, the reaction being carried out so as to produce the said S-bis($\gamma$-amino, $\gamma$-carboxypropyl)-sulfide.

JAKOB A. STEKOL.

No references cited.